Sept. 28, 1965   T. V. MOORE   3,208,519
COMBINED IN SITU COMBUSTION-WATER
INJECTION OIL RECOVERY PROCESS
Filed July 17, 1961   4 Sheets-Sheet 1

Thomas V. Moore INVENTOR.

BY *James A. Reily*
ATTORNEY

Thomas V. Moore INVENTOR.

BY *James A. Reilly*

ATTORNEY

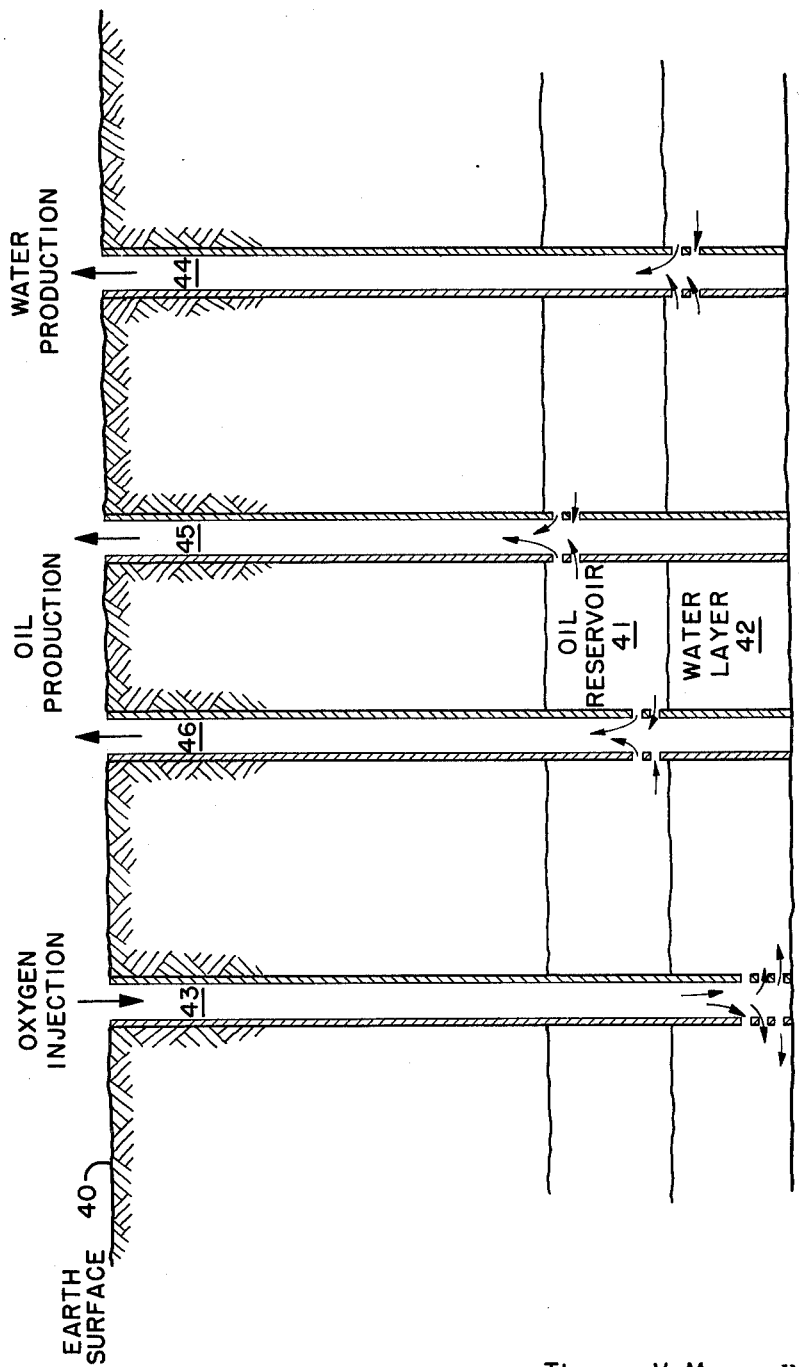

Thomas V. Moore INVENTOR.

United States Patent Office 3,208,519
Patented Sept. 28, 1965

3,208,519
COMBINED IN SITU COMBUSTION-WATER
INJECTION OIL RECOVERY PROCESS
Thomas V. Moore, Houston, Tex., assignor, by mesne
assignments, to Esso Production Research Company, a
corporation of Delaware
Filed July 17, 1961, Ser. No. 124,506
8 Claims. (Cl. 166—11)

This application is a continuation-in-part of U.S. Serial No. 803,880, filed April 3, 1959, in the name of Thomas V. Moore, entitled "Secondary Recovery," now abandoned.

The present invention is broadly concerned with an improved process for increasing the recovery of crude petroleum from subterranean formations. The invention is more particularly concerned with an oil recovery process wherein oxygen and water are simultaneously injected into a subterranean formation in order to displace oil from the formation. The oxygen reacts with a portion of the oil in place to generate heat directly within the formation. The invention is also directed to an improved system for introducing water and oxygen simultaneously within a formation.

A variety of methods have been suggested and used for recovering petroleum from underground reservoirs. Among these methods is the so-called in-situ combustion method wherein air is injected within a reservoir to react with a portion of the oil in place. The combustion generates heat and gases which coact to drive oil from the reservoir. The heat reduces the viscosity of the oil, thereby rendering it more mobile; and it also tends to vaporize a portion of the oil. The gases and vapors formed by the combustion serve as a driving medium for the oil.

Several variations of the in-situ combustion method concept have been practiced. One of these is the "forward combustion" process which consists of injecting air into a reservoir through an input well, effecting combustion between the air and the oil in place, and recovering oil from the reservoir through a spaced output well. In this instance, the combustion front, the injected air, the products of combustion, and the reservoir fluids all flow in a direction from the input well toward the output well.

A second variation of the in-situ combustion process is the so-called "reverse combustion" process. In this variation, a zone of in-situ combustion is formed in the immediate vicinity of what is ultimately to be an output well. Air is then injected into the reservoir through a laterally spaced input well, and it is caused to flow through the reservoir toward the output well. As the air reaches the combustion zone, it reacts with a portion of the oil in place so as to simultaneously: (1) cause the combustion zone to progagate in a direction from the output well toward the input well, and (2) drive and transport oil in a direction from the input well toward the output well.

Still another variation of the in-situ combustion technique is one which combines the forward and reverse combustion procedures. In one embodiment of this variation, a reverse combustion operation is practiced until the combustion front has traveled through a reservoir at least a portion of the distance from the output well toward the input well. At this point, the process is converted to a forward burn operation wherein the output and input wells are reversed in their functions. In other words, air is now injected within what was formerly the output well; and the products of combustion and oil are recovered through what was formerly the input well.

In still another variation of the in-situ combustion concept, water is injected within a reservoir along with air. Such a variation, for example, is described in United States Patent No. 2,788,071. According to this patent, air—or a gas containing less than about twenty-one volume percent oxygen—is used as an oxygen-containing drive medium. Water may be injected along with the air or other such gas so as to generate steam in-situ. When the process nears completion, water may be injected to the entire exclusion of air or other gas.

In operating the above variations of the in-situ combustion process, a number of difficulties and problems have been encountered. For example, "overburning" appears to be virtually unavoidable. This is caused by the fact that air injected within most formations very soon rises to the top of the formations and remains there as it traverses the formations. Major portions of such formations, as a result, are completely missed and unaffected by the combustion reaction. Furthermore, serious operating problems occur when the hot gases of combustion and vapors enter an output well. Corrosion and other serious well damage frequency occur.

Serious inefficiencies also characterize the existing methods of in-situ combustion. Thus, while the use of oxygen-containing gases containing up to roughly twenty-one percent oxygen has been advocated in the interest of obtaining improved combustion control, the cost of compressing the inert diluent in the gas is excessive. Furthermore, it is often difficult to ignite a formation with such a gas; and combustion control is not very effective.

Another source of inefficiency in existing underground combustion processes lies in the large quantities of heated rock that are left behind within a reservoir by such processes. As mentioned earlier, it has been suggested that water be injected along with air in an effort to take advantage of this residual heat; but the addition of such water has introduced other operating problems. One of the most serious of these has been the difficulty of maintaining combustion control. Extinguishment of the combustion reaction, for example, is a continuous hazard.

In contrast with the existing methods of in-situ combustion, the present invention deals with all of the above problems in a most effective manner. Improved operating efficiencies, oil recoveries, and process control are obtained. Output well problems are also minimized.

The present invention overcomes the above problems by the simultaneous injection within a reservoir of water and a gas rich in oxygen. Some of the advantages of the invention may be realized by the use of gas containing as little as about eighty volume percent oxygen. However, oxygen concentrations of ninety percent and preferably ninety-five percent should be employed wherever possible. The amount of water injected, in relation to the oxygen, must be great enough to reduce the temperature of the formation heated by the combustion zone to a preselected temperature. It must also be sufficient to establish or maintain water permeability through the heated portion of the formation left behind by the combustion front. It must not be so great, of course, as to extinguish the combustion—as would be evidenced by the composition of the gases produced from the reservoir. Thus, the amount of water injected must not be less than about 0.5 pound of water per pound of oxygen, and preferably not less than 2.0 pounds of water per pound of oxygen in order to keep the formation below excessive temperature levels. Generally, about 5 to 6 pounds of oxygen is required per cubic foot of formation for combustion purposes. Since a combustion front in moving through a formation will usually displace large proportions, if not all, of the connate water before it, it is also necessary to restore water permeability within the formation following passage of the front. Depending upon the degree of water saturation within the formation prior to passage of the front, the amount of water which should be injected along with the oxygen to re-establish such saturation may be from about 2 to 6 pounds of water per cubic foot of rock, or about 0.3 to 1 pound of water per pound of oxygen. These quantities, of course, will be increased substantially whenever the formation experiences an increased water saturation as a result of oil removal. The particular behavior of a formation in this regard may be readily determined upon core samples removed from formation as will be apparent to those skilled in the art. In any event up to about 2 pounds of additional water per pound of oxygen may be required to water-saturate a formation.

Thus, in applying the process of this invention to oil reservoirs it is contemplated that a total of as little as about 1 pound of water per pound of oxygen will be sufficient in a small proportion of reservoirs in order to retain water permeability and yet realize some of the heat conservation and temperature control benefits of the invention. However, in order to obtain the benefits to the degree generally intended for the invention, water injection rates of at least about 4 pounds of water per pound of oxygen should be used. The best mode of practicing the invention contemplates water injection rates of about 5 to 6 pounds of water per pound of oxygen. If the temperature of the water is substantially above 100° F., somewhat greater quantities of water will be required.

Ignition of the combustion front when using a process embodying the present invention will normally be spontaneous. However, in those reservoirs where spontaneous combustion does not occur, conventional methods of chemical or electrical ignition may be used. Such reservoirs, for example, include the Althabasca tar sands where reservoir temperatures apparently are sufficiently low to inhibit spontaneous combustion of the oil in place.

The operating pressure to be used with the present process in a given reservoir will normally be the pressue already prevailing within the reservoir. However, operating pressures of at least 800 p.s.i. are preferred. At pressures of these magnitudes, carbon dioxide formed by the combustion, and light hydrocarbons vaporized or obtained from the crude oil by cracking, become very soluble in the oil phase.

When practicing the present invention, the oxygen injected within a formation should be injected within the lowermost part of the formation. The water, on the other hand, is preferably injected above the oxygen. In most reservoirs, an especially desirable point for injecting the water is along their upper boundaries. When injected at this point, the water tends to flow downward within the reservoir relative to the injected oxygen and the products of combustion. Very effective contact and heat exchange between the water and the products of combustion are thereby realized. This type of vertical crossflow within a reservoir is not nearly as practicable when using air or gases containing less than twenty-one percent oxygen as advocated by the prior art. When using air or such gases instead of oxygen, the water rate must be reduced to levels which tend to be too low to effectively distribute the heat within a reservoir.

Water injected in accordance with the present invention greatly increases heat utilization within a reservoir by transferring heat from the hot, burned-out rock behind the burning front to the ambient temperature rock preceding the front. The mechanics of the transfer are not entirely understood, but they are known to involve the successive vaporization and condensation of water. In any event, the heat left behind in the reservoir rock by the burning front is conserved and further utilized; and heat losses to formations adjacent the formation of interest are greatly reduced.

It will be desirable in certain operations to inject water and oxygen reasonably uniformly over the entire thickness of a formation of interest. Injection of this character, for example, will be preferred in formations which possess relatively poor vertical communication or permeability. An apparatus for carrying out this type of injection will be described hereinafter.

FIGURES 1 through 5 of the drawing, which forms part of this patent application, help to present a clearer understanding of the invention.

FIGURE 4 is a vertical section of a reservoir which illustrates a preferred embodiment of the invention.

Figure 5:
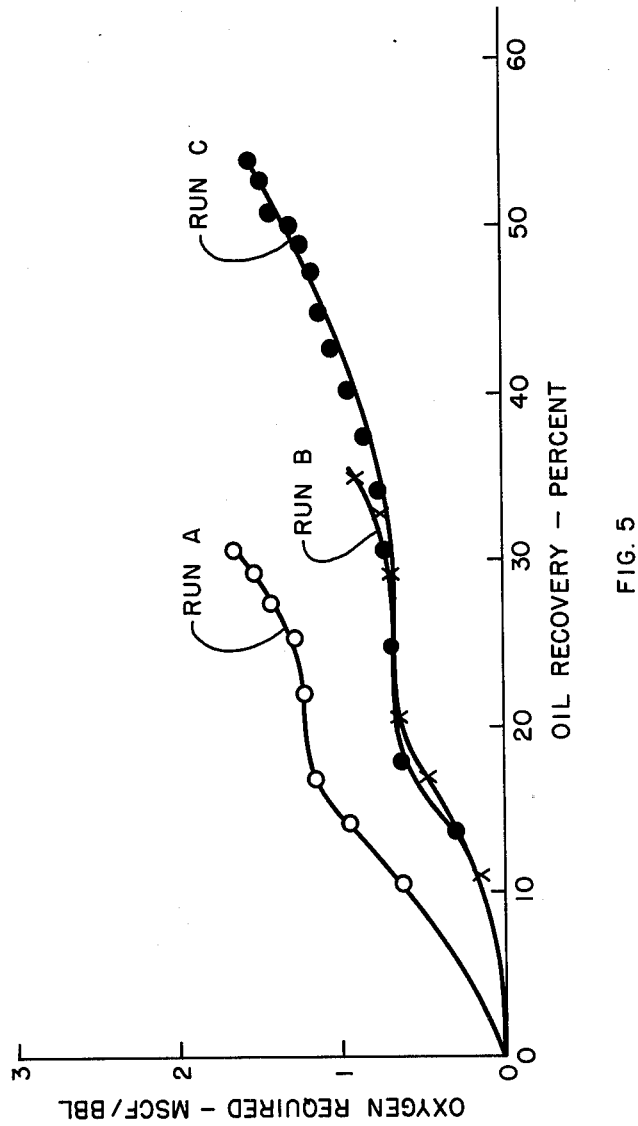

FIGURE 5 presents comparative data showing certain superiorities of the present invention with respect to more conventional processes.

Figure 1:
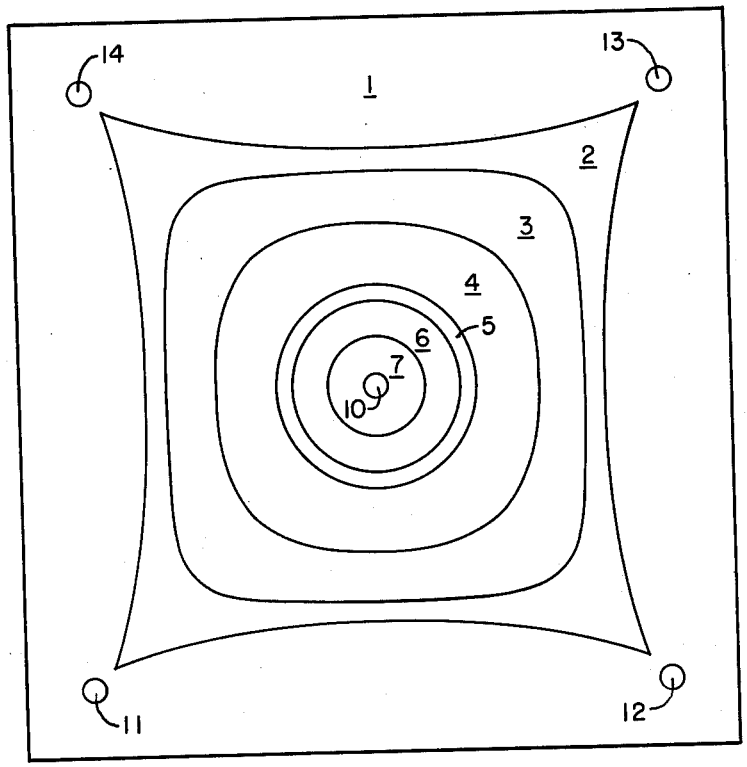
FIGURE 1 is a plan view of a five-well reservoir which illustrates one embodiment of the invention.

One process embodiment of the present invention is shown schematically in FIGURE 1. This figure indicates a number of distinct zones which are in reality not sharply delineated, but instead tend to merge one into another. It is in these zones that the various phases of the present process occur.

The oxygen and water are injected through input well 10, and product is secured from output wells 11, 12, 13 and 14. Only this one operation or well pattern is illustrated, but any number of additional similar operations or patterns can be carried out adjacent one another.

Zone 7, immediately about well 10, is a zone of reservoir rock which has been burned out and through which the mixture of oxygen and water pass from the input well.

Zone 6 is a pre-heating zone in which the injected oxygen and water are pre-heated to a comparatively high temperature by the hot depleted reservoir rock. Pre-heating in this way conserves much of the sensible heat in the burned-out rock and thus reduces the over-all fuel requirements for the process. In this zone most of the injected water is vaporized.

Zone 5 is a combustion zone in which the oxygen comes in contact with the residual oil or coke and is ignited spontaneously, generating carbon dioxide and steam in addition to the steam produced in the pre-heating zone 6. The connate water is also vaporized here.

Zone 4 is a stripping zone in which the carbon dioxide and steam vaporize the volatile components of the oil left within the reservoir, and carry these vaporized constituents forward. Thus the components of the crude oil which are burned in the present operation consist chiefly of the highest boiling components, particularly tar and coke. The vaporized constituents condense down stream and dilute the oil in place, thereby reducing its viscosity and making it easier to recover. Some cracking may also occur in zone 4.

Zone 3 is a condensation zone in which the vaporized hydrocarbons and the stem condense. Zone 3 is also the zone where the generated carbon dioxide goes into solution creating a swelling and displacement of the crude oil. Zone 3, of course, must be of sufficient pressure to cause the carbon dioxide to go into solution and to condense volatile hydrocarbons and the steam. The displacement of oil by condensing steam is far more efficient than in an ordinary waterflood process. The recovery of oil by condensing steam and by miscible displacement may occur in from one-half to three-fourths of the reservoir ahead of the combustion bank. Thus, in a given instance it may be necessary to cause the combustion front to move only about one-fourth to one-half of the distance throughout a reservoir. At this point oxygen injection mas be stopped and water or substantially oxygen-free gas—e.g., methane, natural gas, nitrogen, etc.—thereafter injected. This reduces the oxygen requirements and makes the process considerably more economical. Gas may also be recycled from the production wells to the input wells.

Zone 2 is a zone in which the oil and the condensed volatile oil components being displaced are banked ahead of the advancing front of condensed water. Some of the carbon dioxide and some of the natural gas originally present in the reservoir flow through this zone, displacing the oil. The solution of carbon dioxide in the oil further lowers its viscosity and increases recovery.

As mentioned earlier, the pressure in zone 6 is preferably maintained high enough to secure substantial solubility of carbon dioxide in the reservoir oil. By not having large quantities of nitrogen or other inert gases present, the pressure need not be as high as if such nitrogen or gases were present. However, to achieve such conditions, the pressures should be above about 800 p.s.i., and preferably in the range from about 800 to 1200 p.s.i. Zone 1 is the position of the reservoir which has not yet become affected by the operation of the process.

It is desirable in certain operations to inject the water and oxygen reasonably uniformly over the entire thickness or depth of a section. To accomplish this, a special well completion such as that in FIGURE 2 is desirable.

Figure 2:
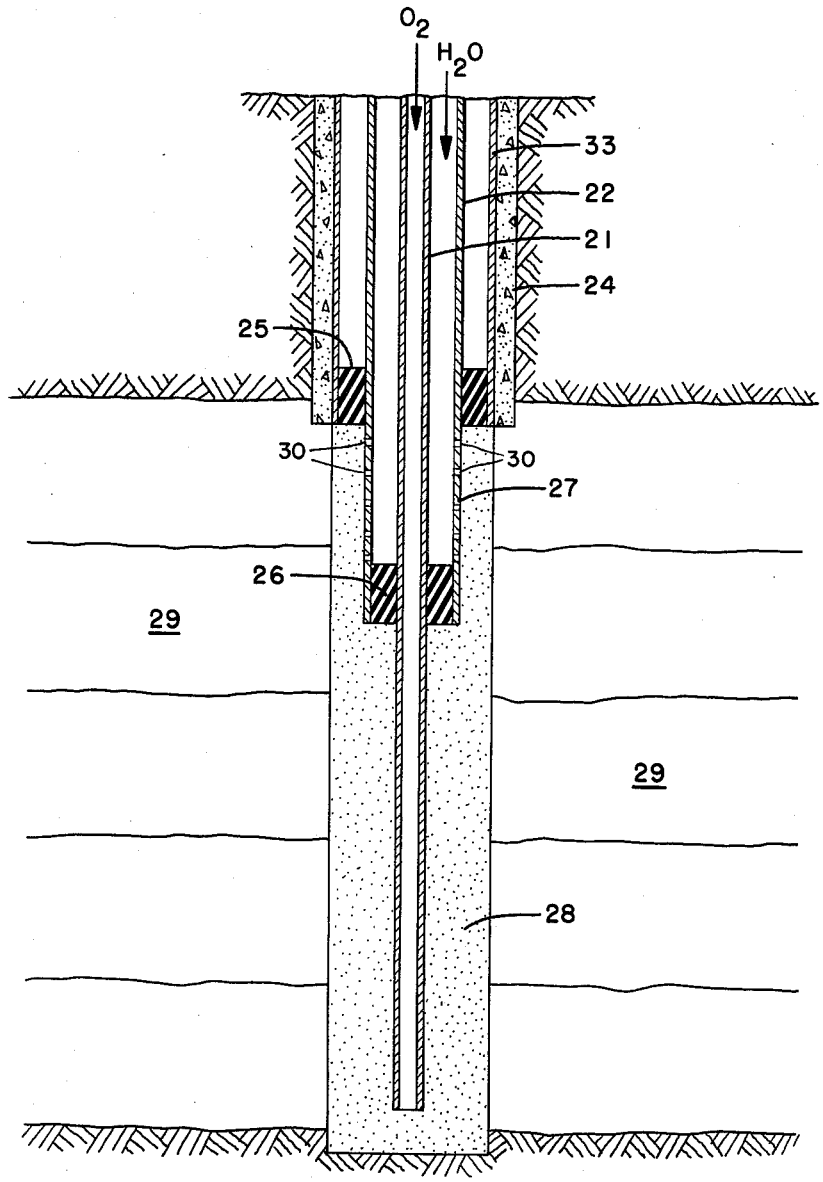
FIGURE 2 depicts a type of well completion particularly contemplated for use with the invention.

Referring to FIGURE 2, a string of pipe is shown extending from the earth's surface to about the bottom of producing zone 29. In accordance with the present process, oxygen is injected through string 21. A string of concentric tubing 22 is positioned about string 21, and water is injected into the upper portion of the formation through the annulus between tubing 22 and string 21. The casing 33 of the well is shown cemented in place by means of cement 24. The water tubing and the casing are sealed as shown by packer 25.

The string for the introduction of oxygen and the string for the introduction of water are sealed as shown by packer 26. The water enters a well bore through perforations 30 in a short perforated section 27 near the top of the producing zone 29. The well bore around the tubing is packed with fine gravel 28 of a size selected so as to provide a packing which is considerably more permeable than the reservoir rock, but which still has a permeability sufficiently low to prevent the rapid segregation of the oxygen and water. In this packing there exists a tendency for the slow percolation of water downwardly and a slow movement of oxygen upwardly, the combination of which results in a relatively uniform distribution of water and oxygen as it is injected into the several layers of the production formation.

An alternate arrangement for injecting oxygen and water is shown in pending Patent Application Serial No. 73,045 filed December 1, 1960, in the name of Othar M. Kiel.

Figure 3:
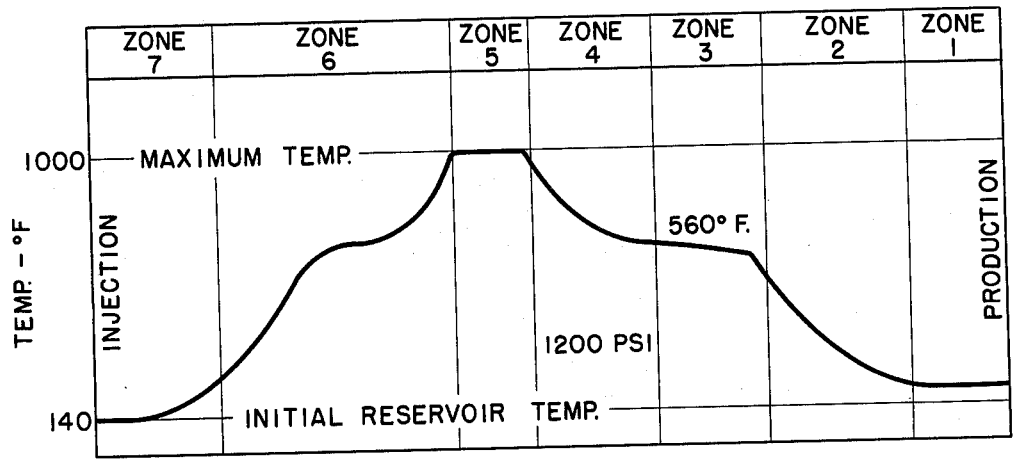
FIGURE 3 is a thermal profile of the reservoir shown in FIGURE 1.

Referring specifically to FIGURE 3, the temperature gradient from zone to zone is illustrated. As pointed out heretofore, zone 7 is the zone wherein oxygen and water move through a stripped zone where the oil saturation is negligible. In zone 6 comprising the pre-heating zone, the injected fluids are pre-heated to relatively high temperatures by the hot depleted reservoir rock. Thus excellent heat transfer is secured.

Zone 5 comprises the combustion zone in which the oxygen comes into contact with residual oil and is spontaneously ignited. In this zone water is converted to steam and carbon dioxide is generated. The water converted to steam comprises injected water as well as connate water.

The steam and carbon dioxide flow forwardly into zone 4 wherein the hot gases strip or volatilize hydrocarbon constituents in the formation and carry the volatilized constituents forward. The steam and hydrocarbon condense to a substantial extent in zone 3 wherein the temperature remains substantially constant. Also, the carbon dioxide under the high pressure dissolves in the hydrocarbons. In zone 2 the condensed volatile oil components are displaced and move forward through zone 1 to the producing well.

FIGURE 4 illustrates a particular technique using the present invention. Legend 41 designates an oil reservoir disposed in the earth's substrata below surface 40. Legend 42 designates a water-bearing reservoir positioned below oil reservoir 41.

In accordance with the present invention, a borehole 43 is extended from the earth's surface into the water reservoir 42. Boreholes 46 and 45 extend from the earth's surface into the oil reservoir 41. A borehole 44 extends from the earth's surface into the water reservoir, preferably near the bottom of the oil reservoir. In operation, oxygen is injected through borehole 43, and this oxygen permeates upwardly through the water reservoir and comes into contact with the oil in the lower area of the oil reservoir. Here it spontaneously ignites, generating steam, vaporized hydrocarbons and carbon dioxide. The pressure generated causes water to produce through borehole 44 and to condense the hydrocarbons in the upper area of the oil reservoir 41. Generated carbon dioxide also dissolves within the hydrocarbons within the oil reservoir. Under these conditions, hydrocarbons are effectively and economically produced through boreholes 46 and 45.

As pointed out heretofore, the invention is carried out under pressure conditions sufficiently high to cause the steam and vaporized hydrocarbons to condense ahead of the combustion front and to cause the carbon dioxide produced by the combustion to dissolve in the hydrocarbon phase ahead of the combustion front. In general, when the pressure is in excess of 700 p.s.i. at reservoir temperatures and preferably at least from 800 to 1000 p.s.i. effective condensation of the steam and vaporized hydrocarbons and effective solution of the carbon dioxide occur. Typically, when the condensing zone is at a pressure of about 800 p.s.i., the existing temperature in this zone will be about 500° F.

In the combustion zone, it is desirable to add water in order to control the temperature of combustion. For example, by adjusting the ratio of water to oxygen entering this zone between about 0.5 and 2 pounds of water per pound of oxygen, temperatures in the range of about 900° F. to 1200° F. may be maintained.

The present process is particularly adaptable to producing oil from those reservoirs where normal producing operations recover only a small percentage of the oil originally in place. Heavy oil reservoirs are examples of the kind of oil fields where the proposed process can be applied economically. The operating conditions will vary, of course, depending upon local conditions that prevail in each field. For the purpose of illustration, a hypothetical example considered typical of satisfactory operating conditions is presented below:

*Example 1*

A typical viscous oil reservoir suitable for the practice of this invention may have a pore space of 1500 barrels per acre-foot. Assuming an original fluid content of 1100 barrels of oil and 400 barrels of water per acre-foot, normal producing operations would produce about 250 barrels of oil per acre-foot, leaving in the reservoir a total of 850 barrels of oil per acre-feet.

Assuming the injection of water and substantially pure oxygen into the reservoir in a ratio of four pounds of water per pound of oxygen, and a reservoir pressure of about 250 p.s.i., an underground combustion process may be carried out in accordance with this invention. Under the prevailing conditions, the oil would burn on contact with the injected oxygen; and the temperature of the rock would increase to about 950° F. The amount of oil consumed as fuel by the process would be about 200 to 250 barrels per acre-foot of residual components. The operation would normally be discontinued at the time zone 3 would have reached the producing wells, since most of the economically recoverable oil would have been obtained by that time. At this time, from one-third to one-half of the rock will have been burned out. The oxygen consumption would amount to about 40 tons of oxygen per acre-foot of rock burned, or 15 to 20 tons of oxygen per acre-foot of reservoir rock. Since the average yield would amount to 600 barrels per acre-foot, the recovery would be the equivalent of roughly 30 to 40 barrels per ton of oxygen consumed. Oxygen consumption of this magnitude permits oil to be recovered economically.

*Example 2*

As further indicative of the value of the present invention, attention is directed to a series of three runs which were made in a scaled-down sand model to compare the oil recoveries obtainable with air and water with the recoveries obtainable with oxygen and water. The model was a one-sixth of a field seven-spot well pattern, and it was designed to be symmetrical about both its input well and its output well. The model had a volume of 1.67 feet, and the sand packed within the model was about 5.2 inches thick and possessed a permeability of about 4600 darcies. Relatively high permeability was necessary in order that the results obtained with the model could be scaled to actual field performance conditions.

Shale stringers were built into the model by placing 3″ x 5″ x 3/16″ slate pieces within the model such that their major axes were horizontal. The pieces were also staggered so as not to create continuous layers across the model. On the average, a vertical section of the model contained five pieces of slate. The total slate volume was about fifteen percent of the sand pack volume, and the vertical permeability of the model was about 0.4 of its horizontal permeability. The over-all porosity of the model for the various runs was about 35 percent.

After the model had been assembled, it was evacuated by means of vacuum pumps for the purpose of removing as much gas as possible from within the model. The model was then filled with ordinary tap water; and crude oil was thereafter injected into the model until no more water was produced. With the connate water content of the model thus established, ignition of the model followed. The crude oil in each run had a density of 60.5 pounds per cubic foot and a viscosity of 2100 centipoises—both of these properties being referred to a temperature of 350° F. The initial temperature of the model before each run was adjusted to this same value.

Each run was started by injecting substantially pure oxgen or air through the input well into the bottom of the model, while energizing a nichrome wire heater located in the face of the sand pack adjacent this well. The use of the nichrome wire heater, while not deemed critical to the operation of the model, made it possible to ignite the model within about fifteen seconds. The rate of oxygen injection in each run was 20 s.c.f./hour. In those runs where air was used, the rate of air injection was approximately five times this value to compensate for the presence of nitrogen.

As soon as ignition occurred, water was injected along with the oxygen or air. The relative amounts of water and air or oxygen varied from one run to the next. Each run was terminated when oil production became negligible. Water injection through the input well was into the top of the formation and simultaneous with, but separate from, the oxygen injection.

In Run A of the three runs of interest, air was injected as the oxidizing medium along with 3.5 pounds of water per pound of oxygen. In Run B, air was injected with 6.2 pounds of water per pound of oxygen. In Run C, pure oxygen was injected along with 6.2 pounds of water per pound of oxygen.

The superior performance of oxygen in combination with water in the process of this invention is particularly clear from the results of the above runs as shown in FIGURE 5. This figure shows the amount of oil in place which was recovered in each of the three runs. It also shows the amount of oxygen which was required in each instance to recover each barrel of oil.

It is clear from FIGURE 5 that oxygen used in combination with water is far superior in oxygen utilization and in volume of oil recovered to air used in combination with water. Of particular interest is the fact that the fire or combustion was actually extinguished in the air-water run which used the same relative amount of water that was employed in the oxygen-water run. This occurred when the amount of oil recovered was only a little more than half of that ultimately recovered in the oxygen-water run. It is also significant in the alternate air-water run that lowering the amount of water avoided the difficulty of extinguishing the burning front. At the same time, however, a great reduction in oxygen utilization was experienced; and there was also a decrease in the amount of oil recovered.

What is claimed is:

1. In a forward combustion method for the recovery of oil from a subterranean reservoir the improvement which comprises introducing gas containing at least 80% free oxygen into said reservoir through an input well under conditions to combust a portion of said oil with said oxygen and to cause oil to flow toward an output well spaced from said input well, simultaneously injecting water into said reservoir through said input well, the quantity of said water being at least about 4 pounds per pound of free oxygen but insufficient to extinguish the combustion.

2. A method as defined in claim 1 in which the quantity of water is between 5 and 6 pounds per pound of free oxygen.

3. In a forward combustion type of in-situ combustion method for the recovery of oil from an underground reservoir wherein an oxygen-containing gas is injected into the reservoir through an input well to burn a portion of the oil in place and to produce oil from the reservoir through a spaced output well, the improvement which comprises maintaining a concentration of at least 80 percent free oxygen in said oxygen-containing gas as injected, simultaneously injecting sufficient water into said reservoir through said input well to maintain water permeability in the heated portion of the reservoir behind the burning front and to reduce the temperature within said heated portion, the amount of water so injected being from 2.3 to 6 pounds per pound of free oxygen in said oxygen-containing gas.

4. A method as defined in claim 3 in which the water is injected within said reservoir vertically above the oxygen-containing gas.

5. A method as defined in claim 4 in which the oxygen-containing gas contains at least 90 percent free oxygen.

6. A method as defined in claim 5 in which the total quantity of water injected is from 4 to 6 pounds per pound of free oxygen.

7. In a forward combustion type of in-situ combustion method of recovering oil from an underground formation which is penetrated by an input well and a laterally spaced output well and wherein a gas containing free oxygen is injected into said formation through said input well to propagate a combustion front toward said output well, the improvement which comprises maintaining a concentration of free oxygen within said gas of at least 80%, and injecting water into said formation through said input well in a quantity sufficient to maintain water permeability in said formation between said input well and said combustion front and also to reduce the temperature of the formation, the total quantity of such water being at least about 4 pounds per pound of injected free oxygen and not more than about six pounds of water per pound of injected free oxygen.

8. A method as defined in claim 7 in which the gas contains at least 90% free oxygen.

References Cited by the Examiner

UNITED STATES PATENTS

| | | | |
|---|---|---|---|
| 1,411,486 | 4/22 | Gallagher | 166—115 |
| 1,594,303 | 7/26 | Keown et al. | 166—115 |
| 2,630,307 | 3/53 | Martin | 166—11 |
| 2,722,277 | 11/55 | Crawford | 166—11 |
| 2,780,449 | 2/57 | Fisher et al. | 166—11 X |
| 2,780,450 | 2/57 | Ljungstrom | 166—11 |
| 2,788,071 | 4/57 | Petzer | 166—11 |
| 2,901,043 | 8/59 | Campion et al. | 166—11 |
| 2,923,356 | 2/60 | Glass et al. | 166—45 X |
| 2,936,030 | 5/60 | Allen | 166—45 X |
| 2,994,375 | 8/61 | Hurley | 166—11 |
| 3,007,521 | 11/61 | Trantham et al. | 166—11 |
| 3,026,937 | 3/62 | Simm | 166—11 X |
| 3,034,579 | 5/62 | Parker | 166—11 |
| 3,134,438 | 5/64 | Huitt et al. | 166—45 |

OTHER REFERENCES

Morse: "Trends In Oil Recovery," Producers Monthly, February 1960, pages 18 to 21, inclusive.

BENJAMIN HERSH, *Primary Examiner.*

CHARLES E. O'CONNELL, *Examiner.*